United States Patent [19]

Gotoh

[11] Patent Number: 4,905,802
[45] Date of Patent: Mar. 6, 1990

[54] SELECTOR LEVER APPARATUS FOR VEHICLE

[75] Inventor: Tadashi Gotoh, Okazaki, Japan

[73] Assignee: Mitsubishi Jidosha Kogyo Kabushiki Kaisha, Tokyo, Japan

[21] Appl. No.: 263,645

[22] Filed: Oct. 27, 1988

[30] Foreign Application Priority Data

Nov. 4, 1987 [JP] Japan .............................. 62-168827[U]
Dec. 15, 1987 [JP] Japan .............................. 62-190111[U]
Sep. 26, 1988 [JP] Japan .............................. 63-125519[U]

[51] Int. Cl.⁴ ......................... G05G 5/10; B60K 41/28
[52] U.S. Cl. ..................................... 192/4 A; 70/247; 74/483 R
[58] Field of Search ............. 74/483 R, 878; 192/4 A; 70/245, 247, 389; 180/271

[56] References Cited

U.S. PATENT DOCUMENTS

| | | | |
|---|---|---|---|
| 2,469,018 | 5/1949 | Swanson | 70/389 |
| 3,708,032 | 1/1973 | Suzuki | 70/389 X |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,235,123 | 11/1980 | Simancik et al. | 74/878 X |
| 4,296,847 | 10/1981 | Arndt | 192/4 A |
| 4,473,141 | 9/1984 | Mochida | 192/4 A |
| 4,572,340 | 2/1986 | Pierce | 192/4 A |
| 4,679,417 | 7/1987 | Van Cise, Jr. | 70/247 |

FOREIGN PATENT DOCUMENTS

| | | | |
|---|---|---|---|
| 5860773 | 1/1975 | Australia | 70/247 |
| 0073563 | 3/1983 | European Pat. Off. | 70/245 |

Primary Examiner—Rodney H. Bonck
Assistant Examiner—Janice E. Chartoff
Attorney, Agent, or Firm—Hedman, Gibson, Costigan & Hoare

[57] ABSTRACT

A selector lever apparatus for a vehicle having an automatic transmission includes a selector lever shiftable to a plurality of mode setting positions including a parking position, and a selector lever lock mechanism. The lock mechanism locks the selector lever to prevent shifting of the lever when the lever is set at the parking position and a brake pedal is not depressed. When the brake pedal is depressed, the lock mechanism releases the locked state of the selector lever.

10 Claims, 5 Drawing Sheets

4,905,802

SELECTOR LEVER APPARATUS FOR VEHICLE

BACKGROUND OF THE INVENTION

1. Field of the Invention

The present invention relates to a selector lever apparatus for vehicles having an automatic transmission.

2. Description of the Related Art

In general, the selector lever of a vehicle having an automatic transmission (to hereinafter be referred to as an AT car) can be shifted to parking position (P) for mechanically fixing an output shaft of the transmission, reverse position (R) for reversing the vehicle, neutral position (N) in which the engine output is completely disconnected from the output shaft of the transmission, drive position (D) wherein the plurality of forward gears are shifted automatically, gear position (2) which limits forward gear selection to the second gear or limits gear-shifting to only between second gear and low gear, and low gear position (L or 1) for limiting forward gear selection to only low gear. The action of shifting the selector lever from the parking position to the drive or reverse position is normally accompanied by the simultaneous pressing of a push button arranged on the selector lever.

Selector levers are roughly classified into the steering column type and the floor-mounted type.

The selector lever of the AT car is normally set at the parking position during parking so as to reliably stop the vehicle. When the vehicle is started, the selector lever is shifted from the parking position to the drive position or the reverse position after the engine is started. In this case, if the shifting operation of the selector lever is performed while the brake pedal is depressed, the vehicle is not abruptly started and hence no problem is posed. However, an accident may be caused because of an erroneous operation of a driver due to carelessness and lack of experience of the driver in spite of the fact that instructions for the starting period are described in a manual of an AT car. For example, in a state wherein the engine is raced after starting of the engine and rotated at high speed, if the parking brake is released and the selector lever is shifted to the drive position or the reverse position without depressing the brake pedal, a driving force is abruptly transmitted to the driving shaft of the vehicle. As a result, the vehicle is abruptly started against the driver's will. Similarly, if the selector lever is shifted to the drive position or the reverse position while the engine is rotated at high speed, e.g., during warming up, the vehicle is abruptly started. In addition, since such unexpected and sudden starting accompanies a relatively large shock, the driver tends to be confused. This may further cause an erroneous operation that the driver steps on the accelerator pedal instead of the brake pedal by mistake, thereby causing an accident.

Recently, demands have been arisen for a technique which can reliably prevent abrupt starting of an AT car due to an erroneous operation of a driver.

SUMMARY OF THE INVENTION

The present invention has been made in consideration of the above situation, and has as its object to provide a compact vehicle selector lever apparatus which can reliably prevent an erroneous operation of a driver and abrupt starting of a vehicle.

In order to achieve the above object of the present invention, there is provided a selector lever apparatus comprising a selector lever, and a detent pin arranged on the selector lever so as to be moved between a first position at which the detent pin is engaged with a detent plate and a second position at which engagement with the detent plate is released, wherein the selector lever can be shifted among a plurality of mode setting positions including a parking position, at which an output shaft of an automatic transmission is fixed, by engaging or disengaging the detent pin with or from the detent plate. The apparatus further comprises a lock cam having a first engaging portion in which the detent pin is engaged when the selector lever is shifted to the parking position, the lock cam being interlocked with movement of the detent pin while the selector lever is at the parking position, so that the lock cam is moved to a lock position when the detent pin is moved to the first position and moved to a release position when the detent pin is moved to the second position; and a selector lever lock mechanism for restricting movement of the detent pin by locking the lock cam to the lock position when a brake pedal is not depressed while the lock cam is located at the lock position, and releasing the lock cam when the brake pedal is depressed.

According to the above-described selector lever apparatus, the selector lever cannot be shifted from the parking position to another position without depressing the brake pedal and releasing a locked state of the lock cam.

BRIEF DESCRIPTION OF THE DRAWINGS

FIGS. 1 to 7 show a selector lever apparatus according to a first embodiment of the present invention, in which FIG. 1 is a partially cutaway side view schematically showing the overall apparatus, FIG. 2 is a perspective view of the apparatus, FIG. 3 is a schematic perspective view showing an outer appearance of the apparatus, FIG. 4 is a circuit diagram of a driving circuit, FIG. 5 is a front view showing part of a key cylinder in a lock release state, FIG. 6 is a partially cutaway side view schematically showing the overall apparatus in an operation state different from that in FIG. 1, and FIG. 7 is a front view showing part of the key cylinder in a locked state;

FIGS. 9 and 10 show a selector lever apparatus according to a third embodiment of the present invention, in which FIG. 9 is a partially cutaway side view of the apparatus, and FIG. 10 is a plan view of the apparatus.

DETAILED DESCRIPTION OF THE PREFERRED EMBODIMENTS

Figure 5:
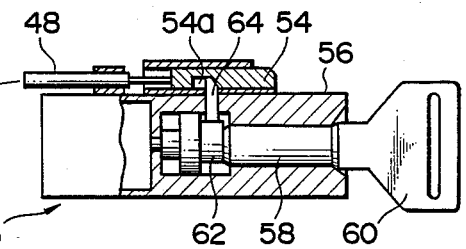
Figure 5:
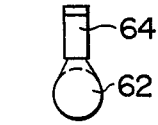

Embodiments of the present invention will be described in detail with reference to the accompanying drawings.

FIGS. 1 to 6 show a floor-mounted type selector lever apparatus according to a first embodiment of the present invention. This selector lever apparatus comprises selector lever 10 formed of a hollow metal rod. Knob 12 is fixed on the distal end of selector lever 10. Operation button 14 is arranged on knob 12. The proximal end of selector lever 10 extends through through hole 20a of mount plate 20 fixed on a vehicle body, and is pivotally supported by pivot mechanism 21 below the mount plate. The proximal end of the selector lever 10 is connected to an automatic transmission 19 through an output shaft 23. With this arrangement, selector lever 10 can be selectively shifted to one of the positions to be described later, i.e., parking position (P), reverse position (R), neutral position (N), drive position (D), second gear position (2), and low gear position (1). In addition, slit 16 is formed in a lower portion of selector lever 10 and extends in its axial direction. Detent pin 18 extends outward from slit 16. As is apparent from FIG. 2, detent pin 18 can be moved along slit 16 between a first position indicated by a solid line and a second position indicated by a broken line. Detent pin 18 is normally held at the first position by a return spring (not shown) arranged in lever 10, and is moved to the second position upon depressing of operation button 14.

Figure 1:
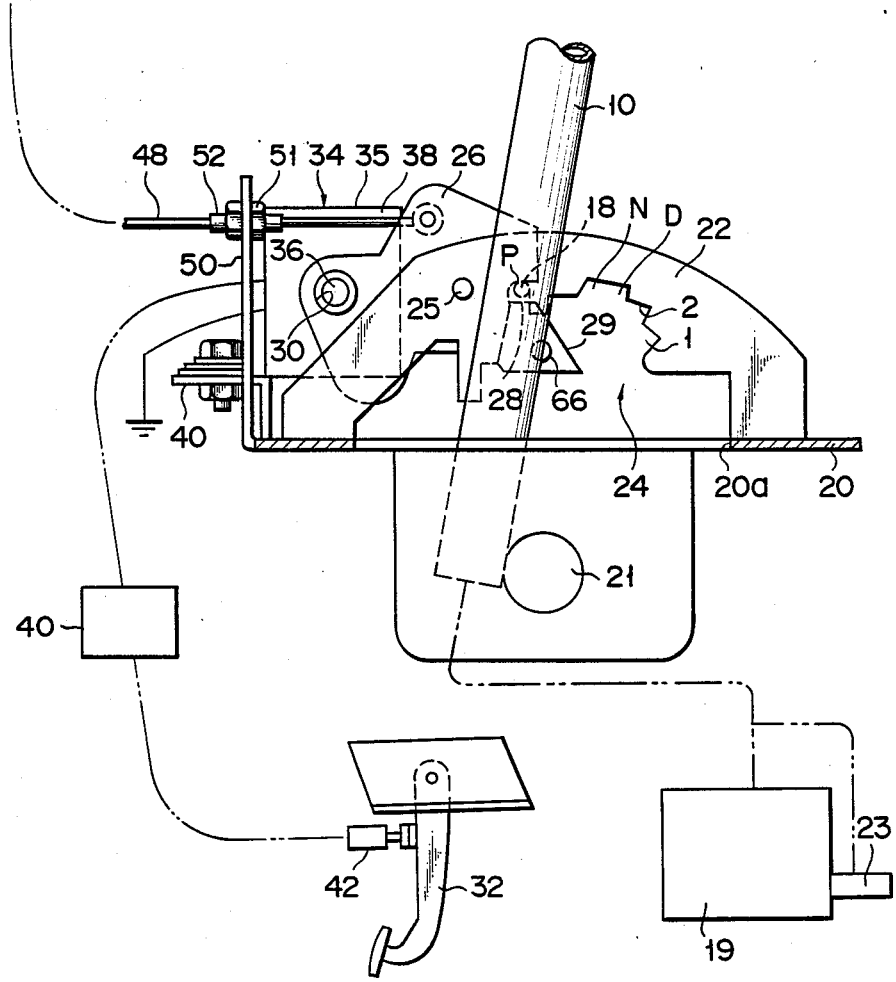
Figure 2:
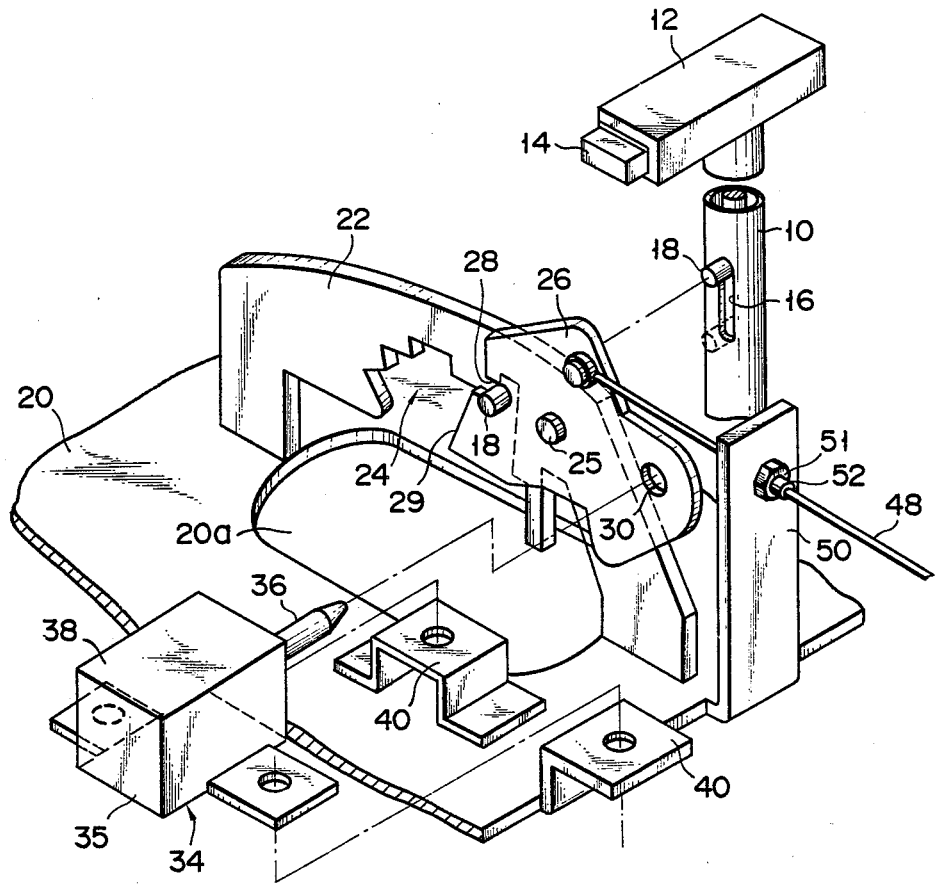

Detent plate 22 for holding selector lever 10 at a desired shifting position is erected on mount plate 20 so as to extend across hole 20a and oppose lever 10. Detent plate 22 is designed as a cam plate integrally formed with mount plate 20. Detent plate 22 comprises position setting portion 24 constituted by a plurality of steps p, R, N, D, 2, and 1 corresponding to the respective shifting positions of selector lever 10. Especially, step P is formed to be deeper than other steps and has a recessed shape. Selector lever 10 will be held at a desired shifting position by shifting lever 10 to the desired position and engaging detent pin 18 with the corresponding step. Note that when detent pin 18 is located at the first position, it can be engaged with a desired step, and when pin 18 is moved to the second position, it is disengaged from the step so as to allow the shifting operation of selector lever 10. FIGS. 1 and 2 show a state wherein selector lever 10 is set at the parking position. In this state, the output shaft 23 of the automatic transmission 19 is fixed.

Lock cam 26 is rotatably supported on detent plate 22 by pivot shaft 25. Lock cam 26 is located to oppose selector lever 10 with detent plate 22 being interposed therebetween and is rotatable within a plane parallel to detent plate 22. Lock cam 26 includes, on one side of pivot shaft 25, first engaging portion 28 constituted by a notch and cam surface 29 continuously formed therewith, and includes, on the other side of pivot shaft 25, second engaging portion 30 constituted by a through hole. First engaging portion 28 is positioned to substantially oppose step P of detent plate 22. When selector lever 10 is shifted to the parking position, detent pin 18 is engaged with first engaging portion 28. When detent pin 18 is moved from the first position to the second position with pin 18 engaged with first engaging portion 28 while lever 10 is set at the parking position, lock cam 26 is interlocked with movement of detent pin 18 to be rotated between the engaging position and the release position. That is, if detent pin 18 is located at the first position and is engaged with step P as shown in FIG. 1, lock cam 26 is rotated by detent pin 18 to the lock position shown in FIG. 1. If detent pin 18 is moved to the second position and is disengaged from step P, lock cam 28 is urged downward by detent pin 18 and is rotated to the release position shown in FIG. 6.

Figures 3, 4:
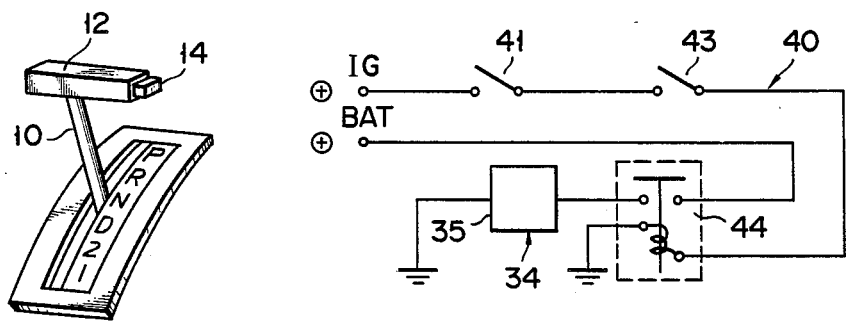

On mount plate 20 are mounted solenoid 35 serving as a driving mechanism for selector lever lock mechanism 34 which is operated upon interlocking with a depressing operation of brake pedal 32, and plunger 36 driven by solenoid 35 and serving as an engaging member. Solenoid 35 is housed in case 38. Case 38 is fastened by screws to bases 40 which are mounted on mount plate 20. When lock cam 26 is located at the lock position, plunger 36 is positioned coaxially with the through hole constituting second engaging portion 30 of lock cam 26. When solenoid 35 is in a non-energized state, plunger 36 is biased by a return spring (not shown) in a direction to extend from case 38, i.e., in a direction to be fitted in second engaging portion 30. When solenoid 35 is energized, plunger 36 is biased by solenoid 35 in a direction to be inserted into case 38, i.e., in a direction to be pulled out from second engaging portion 30. Solenoid 35 is connected to driving circuit 40 for energizing solenoid 35 upon a depressing operation of brake pedal 32. As is shown in FIGS. 1 and 4, driving circuit 40 comprises normally-open parking switch 41 which is turned ON when selector lever 10 is shifted to the parking position, and normally-open interlock switch 43 connected to solenoid switch 42 for turning on a brake lamp. Switches 41 and 43 are connected to an ignition switch in series. Solenoid switch 42 is coupled to brake pedal 32 so that switch 42 is turned OFF when brake pedal 32 is not depressed, and is turned ON when it is depressed. Interlock switch 43 connected to solenoid switch 42 is switched upon an operation of switch 42, i.e., a depressing operation of brake pedal 32. That is, switch 43 is turned OFF when brake pedal 32 is not depressed, and is turned ON when it is depressed. In addition, switch 43 is connected to normally-open contact 44 for electrically connecting solenoid 35 to a battery.

With this arrangement, if brake pedal 32 is not depressed in a state wherein selector lever 10 is set at the parking position, a current is not flowed to solenoid 35 of lever lock mechanism 34, and hence plunger 36 protrudes and is inserted in second engaging portion 30 of lock cam 26. Consequently, rotation of lock cam 26 is restricted by plunger 36 so that lock cam 26 is locked at the lock position. Detent pin 18 which is engaged with first engaging portion 28 of lock cam 26 at the first position is locked by lock cam 26 and hence cannot be moved to the second position. As a result, selector lever 10 is held in a state wherein lever 10 cannot be moved from the parking position to another position.

When brake pedal 32 is depressed while selector lever 10 is set at the parking position, interlocked switch 43 is turned ON, and contact 44 is turned ON in response to this operation. Consequently, a current is flowed from the battery to solenoid 35, and plunger 38 is attracted to solenoid 35 and is pulled out from second engaging portion 30. As a result, lock cam 26 is set in a rotatable state, and detent pin 28 is released from the locked state. Therefore, a shifting operation of selector lever 10 is enabled.

Selector lever lock mechanism 34 restricts rotation of lock cam 26 in accordance with the actuation of brake pedal 32 in this manner, thereby allowing selector lever 10 to be shifted from the parking position to another position only when brake pedal 32 is actuated.

As is shown in FIGS. 1 and 2, one end of cable 48 serving as a connecting member of key interlock mechanism 46 is rotatably coupled to lock cam 26 above pivot shaft 25. Support plate 50 extends upright on mount plate 20. Guide sleeve 52 is fixed to support plate 50 by nut 51. One end portion of cable 48 extends through guide sleeve 52. The other end of cable 48 is coupled to lock slider 54 which is arranged on the outer surface of key cylinder 56 to be slidable along the axial direction of key cylinder 56. Lock slider 54 has engaging recess 54a opened toward the outer surface of key cylinder 56. When cable 48 is moved upon rotation of lock cam 26, it slides lock slider 54 between a release position shown in FIG. 1 and a lock position shown in FIG. 6.

Rotary sleeve 58 is coaxially arranged in key cylinder 56. Sleeve 58 is rotated by ignition key 60. Sleeve 58 has cam 62 which is rotated integrally therewith. In addition, key cylinder 56 has lock pin 64 arranged therein. The lower end of pin 64 is in contact with the cam surface of cam 62. Therefore, lock pin 64 is moved in the radial direction of key cylinder 56 upon rotation of cam 62. When ignition key 60 is rotated to the lock position, i.e., a position where key 60 can be pulled from key cylinder 56, lock pin 64 is pushed by cam 62 to protrude from the outer surface of key cylinder 56, as is shown in FIG. 5. Note that when lock slider 54 is located at the release position shown in FIG. 1, i.e., when selector lever 10 is set at the parking position and lock cam 26 is set at the lock position, engaging recess 54a opposes the distal end portion of lock pin 64. Consequently, lock pin 65 can protrude from the outer surface of cylinder 56 only when lock slider 54 is set at the release position. In addition, when lock slider 54 is set at the lock position, radially outward movement of lock pin 65 is restricted by lock slider 54.

Note that in FIG. 1, reference numeral 66 denotes a stopper pin extending from lock cam 26. Stopper pin 66 restricts excessive rotation of lock cam 62 in cooperation with detent plate 22.

The operation of the selector lever apparatus having the above-described arrangement will be described.

As is shown in FIG. 1, when selector lever 10 is set at the parking position while operation button 14 is not pushed and brake pedal 32 is not depressed, detent pin 18 is located at the first position and engaged with step P of detent plate 22. In addition, detent pin 18 is engaged with first engaging portion 28 of lock cam 26. As a result, lock cam 26 is rotated to the lock position shown in FIG. 1. Since brake pedal 32 is not depressed, solenoid 35 of lever lock mechanism 34 is not excited, and hence plunger 46 protrudes and is fitted into second engaging portion 30 of cam 26. Consequently, lock cam 26 is inhibited by plunger 36 from rotating and is locked at the lock position. As a result, detent pin 18 of selector lever 10 is locked by lock cam 26 at the first position, and hence lever 10 is held in a state wherein a shifting operation thereof cannot be performed.

Since lock cam 26 is rotated to the lock position, lock slider 54 of key interlock mechanism 46 is pushed by cable 48 to the release position. For this reason, engaging recess 54a of lock slider 54 is opposite to lock pin 64 so that lock pin 64 can protrude from key cylinder 56 into engaging recess 54a. Therefore, lock pin 64 does not interfere with rotation of cam 62, and ignition key 60 can be rotated to the lock position shown in FIG. 1 so as to be pulled out from key cylinder 56.

Figure 6:
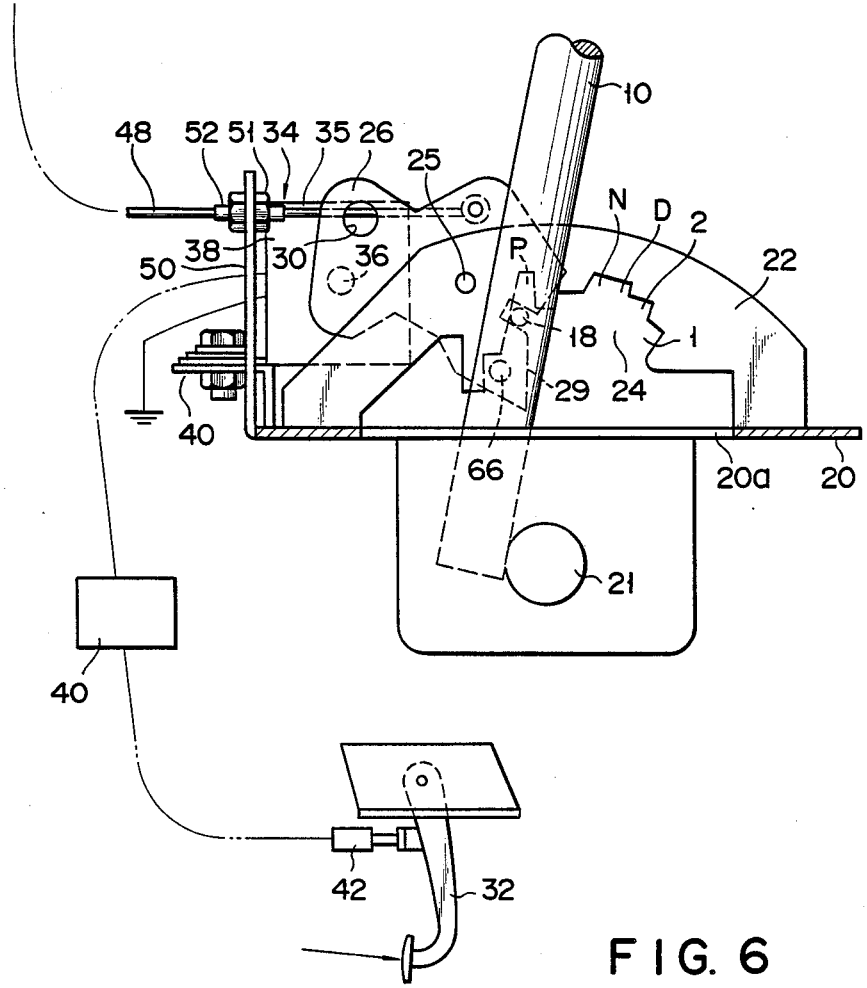

Selector lever 10 can be shifted only when ignition key 60 is rotated to a position other than the lock position and brake pedal 32 is depressed. That is, when ignition key 60 is rotated to a position other than the lock position, engagement of lock pin 64 with lock slider 54 is released. In this state, when brake pedal 32 is depressed, solenoid 35 is energized. With this operation, plunger 36 is attracted into solenoid 35 and released from second engaging portion 30 of cam 26. As a result, the locked state of lock cam 26 is released, and cam 26 is set in a rotatable state. If operation button 14 of selector lever 10 is pushed to move detent pin 8 from the first position to the second position, as is shown in FIG. 6, lock cam 26 is urged by detent pin 18 and rotated to the release position. At the same time, detent pin 18 is disengaged from step P. As a result, a shifting operation of selector lever 10 can be performed. When selector lever 10 is shifted from the parking position to, e.g., drive position D, parking switch 41 of driving circuit 40 is turned OFF, and solenoid 35 is set in the non-excited state again. Thus, plunger 36 is urged by the return spring and protrudes to be brought into elastic contact with lock cam 26. Therefore, when lock cam 26 is rotated to the lock position shown in FIG. 1 again, plunger 36 is automatically fitted into second engaging portion 30 so as to lock lock cam 26.

Figure 7:
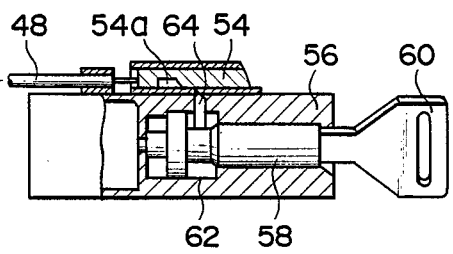
Figure 7:
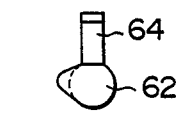

When lock cam 26 is rotated from the lock position to the release position, cable 48 having one end coupled to lock cam 26 is pulled by the cam. Consequently, lock slider 54 is moved by cable 48 from the release position to the lock position in FIG. 6. Note that when lock cam 26 is rotated, ignition key 60 has been already rotated to a position other than the lock position as described above, so that lock pin 64 is drawn into key cylinder 56. Therefore, lock pin 64 does not interfere with movement of lock slider 54. When lock slider 54 is moved to the lock position, engaging recess 54a is displaced from the position opposite to lock pin 64. Therefore, lock pin 64 is prevented by lock slider 54 from moving in a direction to protrude from key cylinder 56. Consequently, even if a driver attempts to rotate ignition key 60 to the lock position in this state, ignition key 60 cannot be rotated to the lock position because rotational movement of cam 62 is prevented by lock pin 64, as is apparent from FIG. 7. That is, when selector lever 10 is set at a position other than the parking position, ignition key 60 cannot be pulled out of key cylinder 56 because of the function of key interlock mechanism 46.

While selector lever 10 is set at a position other than the parking position, lock cam 26 is kept at the release position. When selector lever 10 is to be shifted, e.g., from the drive position to the parking position, first, operation button 14 is pushed so as to move detent pin 18 to the second position, thereby disengaging it from step D. In this state, when selector lever 10 is pivoted to the parking position, detent pin 18 is engaged with first engaging portion 28 of lock cam 26. Note that if first engaging portion 28 is slightly shifted from the movement path of detent pin 18 toward the lock position during pivotal movement of selector lever 10, detent pin 18 abuts cam surface 29 of cam 26 and slides thereon, so that cam 26 is automatically rotated to the release position wherein first engaging portion 28 faces pin 18. Therefore, when selector lever 10 is shifted to the parking position, detent pin 18 is reliably engaged with first engaging portion 28.

When operation button 14 is released while detent pin 18 is engaged with first engaging portion 28, pin 18 is returned from the second position to the first position by means of the return spring. Lock cam 26 is rotated to the lock position upon the movement of detent pin 18. When lock cam 26 reaches the lock position, plunger 36 of engaging mechanism 34 is fitted into second engaging portion 30 to lock lock cam 26 at the lock position, as described above. In addition, lock slider 54 is moved to the release position by cable 48. As a result, the state shown in FIG. 1 is set again.

Since the selector lever apparatus having the above-described arrangement comprises selector lever lock mechanism 34 which operates upon the depressing operation of brake pedal 32, selector lever 10 cannot be shifted from the parking position to another position without depressing brake pedal 32. With this arrangement, an erroneous operation of a driver can be prevented, and abrupt starting of a vehicle can be reliably prevented even when the selector lever is shifted immediately after racing the engine or in a warming up. In addition, the key interlock mechanism realizes an arrangement wherein the ignition key cannot be pulled out when selector lever 10 is set at a position other than the parking position. Consequently, when the driver leaves the vehicle after pulling out the ignition key, selector lever 10 is always set at the parking position for mechanically fixing the transmission. Therefore, the vehicle can be reliably kept stopped during parking, and safety is improved.

Furthermore, the mechanism for inhibiting the shifting operation of selector lever 10 from the parking position to another position, and the key interlock mechanism for allowing the ignition key to be pulled out only when lever 10 is set at the parking position are operated with interlocking with each other by using single lock cam 26. For this reason, no independent structure for operating these mechanisms is required, and hence the number of parts and assembly steps can be decreased, and a space for installing both the mechanisms can be reduced. As a result, an inexpensive apparatus having a simple structure can be obtained.

Figure 8:
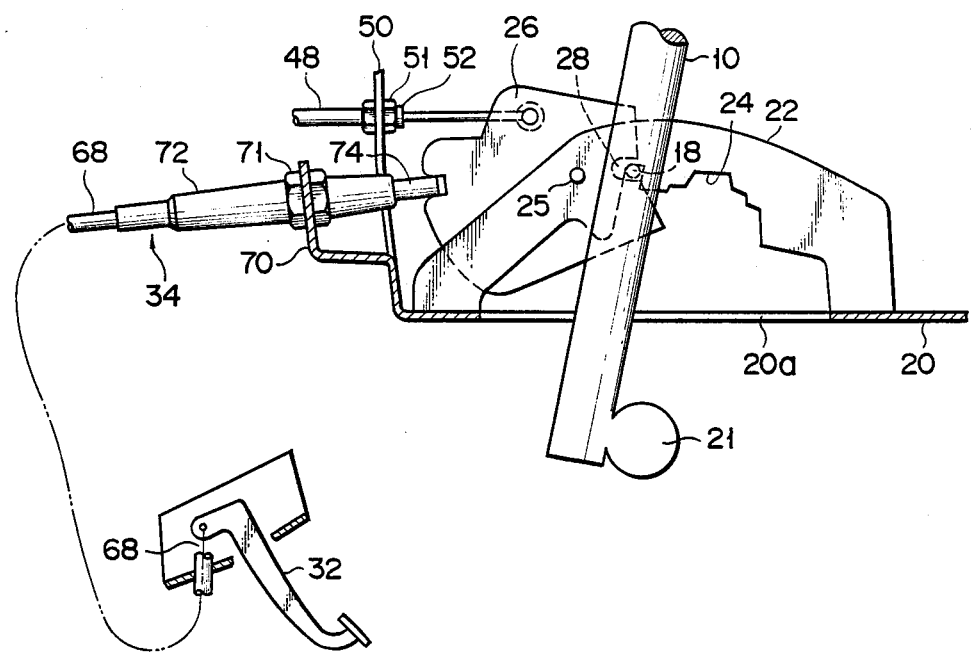
FIG. 8 is a partially cutaway side view showing a selector lever apparatus according to a second embodiment of the present invention.

FIG. 8 shows a selector lever apparatus according to a second embodiment of the present invention.

In the second embodiment, an arrangement of a second engaging portion of a lock cam and a selector lever lock mechanism is different from that of the first embodiment. Other arrangements are the same as those of the first embodiment. The same reference numerals in the second embodiment denote the same parts as in the first embodiment, and a description thereof will be omitted.

According to the second embodiment, second engaging portion 30 of lock cam 26 is constituted by a notch formed in an edge of lock cam 26. Lever lock mechanism 34 comprises lock cable 68. The proximal end of cable 68 is coupled to brake pedal 32, whereas the distal end of cable 68 extends near lock cam 26. Support plate 70 is formed upright on mount plate 20. Guide sleeve 72 is fixed to support plate 70 by nut 71 and extends in a direction parallel to the surface of lock cam 26. The distal end portion of lock cable 68 is slidably inserted in guide sleeve 72, and lock pin 74 is fitted on its distal end. Lock cable 68 is moved backward and forward upon the operation of brake pedal 32. Lock pin 74 protrudes from or is withdrawn from guide sleeve 72 in accordance with the reciprocation of cable 68. While brake pedal 32 is not depressed, lock pin 74 protrudes from guide sleeve 72 and is fitted in second engaging portion 30 of lock cam 26. With this operation, lock pin 74 inhibits rotation of cam 26 and locks it at the lock position shown in FIG. 8. When brake pedal 32 is depressed, lock pin 74 is withdrawn together with lock cable 68, and disengaged from second engaging portion 30.

Also in the second embodiment arranged in this manner, while selector lever 10 is set at the parking position and brake pedal 32 is not depressed, lock cam 26 is locked at the lock position by lever lock mechanism 34, and selector lever 10 is held in a state wherein lever 10 cannot be shifted from the parking position to another position. A shifting operation of selector lever 10 can be allowed only when brake pedal 32 is depressed. Therefore, the same effects as in the first embodiment can be obtained. In addition, according to the second embodiment, selector lever lock mechanism 34 is constituted by the cable and pin without using a solenoid, driving circuit, and the like. For this reason, a less expensive selector lever apparatus having a simpler structure can be provided.

Figure 9:
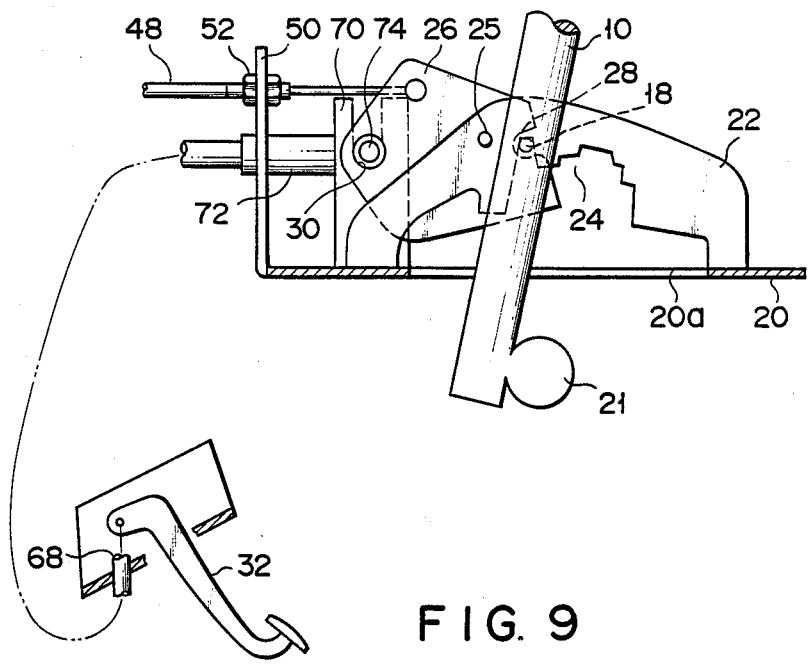
Figure 10:
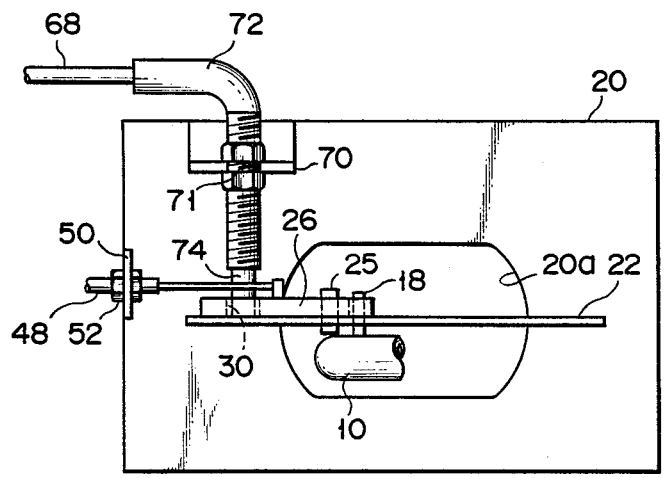

FIGS. 9 and 10 show a selector lever apparatus according to a third embodiment of the present invention.

The third embodiment is different from the second embodiment in a method of fixing a distal end portion of lock cable 68. More specifically, according to the third embodiment, second engaging portion 30 of lock cam 26 is constituted by a through hole. In addition, support plate 70 erected on mount plate 20 extends parallel to cam 26. Guide sleeve 72 which is fixed to support plate 70 by nut 71 is bent at right angle, and its distal end portion extends coaxially with the through hole constituting second engaging portion 30. That is, the distal end portion of guide sleeve 72 extends in a direction perpendicular to the surface of lock cam 26. Lock pin 74 is fixed to the distal end of lock cable 68 inserted in guide sleeve 72. Lock pin 74 is designed to be fitted in and disengaged from second engaging portion 30 in accordance with reciprocation of cable 68. Therefore, while selector lever 10 is set at the parking position, lock pin 74 is fitted in second engaging portion 30 of lock cam 26 to lock it at the lock position as brake pedal 32 is not depressed, and is disengaged from second engaging portion 30 to allow rotation of lock cam 26 as brake pedal 32 is depressed.

In the third embodiment arranged in the above-described manner, the same effects as in the second embodiment can be obtained.

What is claimed is:

1. A selector lever apparatus for a vehicle having an automatic transmission, said apparatus comprising:
   a selector lever shiftable to a plurality of mode setting positions including a parking position wherein an output shaft of said automatic transmission is fixed;
   a detent plate arranged near said selector lever and having a plurality of engaging portions corresponding to the plurality of mode setting positions of said selector lever, said selector lever having a detent pin movable between a first position wherein said detent pin is engaged with one of the engaging portions of the detent plate so as to hold the selector lever at the corresponding mode setting position and a second position wherein said detent pin is disengaged from said engaging portion so as to allow shifting of the selector lever;
   a lock cam having a first engaging portion with which said detent pin is engaged when said selector lever is set at the parking position, for interlocking with movement of the detent pin while said selector lever is set at the parking position so that the lock cam is moved to a lock position when the detent pin is moved to the first position, and moved to a release position when the detent pin is moved to the second position; and
   a selector lever lock mechanism for locking said lock cam at the lock position so as to restrict movement of said detent pin when a brake pedal is not depressed while said lock cam is located at the lock position, and for releasing said lock cam from the lock position when said brake pedal is depressed.

2. An apparatus according to claim 1, wherein said lock cam includes a second engaging portion, and said selector lever lock mechanism includes an engaging member arranged to be capable of engaging with said second engaging portion of said lock cam located at the lock position, driving means for engaging said engaging member with said second engaging portion of said lock cam located at the lock position so as to restrict movement of said lock cam when said brake pedal is not depressed, and disengaging said engaging member from said second engaging portion so as to allow movement of said lock cam when said brake pedal is depressed.

3. An apparatus according to claim 2, wherein said engaging member includes a plunger, said driving means includes a solenoid for driving said plunger, and a driving circuit, connected between said solenoid and said brake pedal, for energizing said solenoid in response to a depressing operation of said brake pedal.

4. An apparatus according to claim 2, wherein said driving means includes a connecting member having one end connected to said engaging member and the other end connected to said brake pedal, and adapted to be moved backward and forward in accordance with a depressing operation of said brake pedal.

5. An apparatus according to claim 2, wherein said lock cam is supported by said detent plate to be rotatable between the lock and release positions.

6. An apparatus according to claim 5, wherein said second engaging portion includes an engaging hole formed in said lock cam, said engaging hole having an axis parallel to a rotational axis of said lock cam, and said engaging member is arranged to be movable in a direction parallel to the axis of said engaging hole.

7. An apparatus according to claim 5, wherein said second engaging portion includes a recess formed in an edge of said lock cam, and said engaging member is arranged to be movable in a direction crossing the rotational axis of said lock cam.

8. An apparatus according to claim 1, which further comprises a key interlock mechanism, arranged to be interlocked with movement of said lock cam, for locking a key cylinder portion for an ignition key to inhibit pull-out of said ignition key from said key cylinder portion when said lock cam is moved to the release position, and for releasing the locked state of said key cylinder portion to allow pull-out of said ignition key from said key cylinder portion when said lock cam is moved to the lock position.

9. An apparatus according to claim 8, wherein said key interlock mechanism includes a lock member mounted on said key cylinder to be movable between a first position for locking said key cylinder portion and a second position for releasing the locked state, and a connecting member for connecting said lock cam to said lock member so as to move said lock member to the second position when said lock cam is moved to the lock position, and to move said lock member to the first position when said lock cam is moved to the release position.

10. An apparatus according to claim 9, wherein said key interlock mechanism includes a cam arranged in said key cylinder to be rotatable integrally with said ignition key, and a lock pin having an end which is in contact with said cam and adapted to move upon rotational movement of said cam, and said lock member is arranged so as to restrict movement of said lock pin at the first position and allow free movement of said lock pin at the second position.

* * * * *